United States Patent Office 3,414,595
Patented Dec. 3, 1968

3,414,595
PREPARATION OF ALKYL TIN COMPOUNDS
Vincent Oakes, St. Helens, England, assignor to Pure Chemicals Limited, Liverpool, England, a British company
No Drawing. Filed Aug. 25, 1965, Ser. No. 482,604
Claims priority, application Great Britain, Aug. 27, 1964, 35,101/64
3 Claims. (Cl. 260—429.7)

ABSTRACT OF THE DISCLOSURE

A method of preparing alkyltin trihalides which comprises heating an alkyl halide and stannous halide in the presence of a catalyst. In the preferred embodiment the catalyst is an organic Lewis base. The organic Lewis base may be either a strong Lewis base such as a hydrocarbon phosphite, a hydrocarbon phosphine, a dialkyl formamide, or a sulphone; a moderately strong Lewis base containing two or more basic groups such as hydroxyl, thioether, ether, mercaptan, carbonyl, nitrile, ester, or amide; or a simple compound having the aforementioned basic groups in the presence of certain metals or metallic salts. It is preferred to use reaction temperatures above about 120° C.

---

This invention relates to a new method for the preparation of alkyltin trihalides.

In the past, it has been fairly difficult to prepare such compounds and the known methods result in a large proportion of unwanted by-products being formed which adds to the overall production costs. Thus, for instance, the usual method of production is to form a tetra alkyltin compound such as tetra butyltin by reaction of stannic chloride with butyl magnesium chloride and then disproportionate the tetra alkyltin with more stannic chloride to give the desired monobutyltin trichloride. The main difficulty associated with this method of production is that large quantities of the related di and trialkyltin halides are also formed, which in addition to being difficult to remove, increases the production costs greatly if no commercial outlet for these products can be found. The new method of manufacture described by the present invention eliminates the formation of the unwanted by-products and affords substantially pure mono alkyltin halides in good yield.

According to the invention, alkyltin trihalides are prepared by heating together an alkyl halide and stannous halide in the presence of a catalyst. Reaction temperatures in excess of 120° C. are usually required to effect reaction and the most favorable working temperature is around 160–170° C.

One of the objects of the invention is to provide a method of making mono butyltin trihalides and mono octyltin trihalides which are finding increasing use in industry at the present time. In order to obtain these products, the corresponding butyl or octyl halide is used as one of the starting materials. However, the process is by no means limited to the use of such halides as reaction can equally be brought about between stannous halide and any alkyl mono halide, alkyl polyhalide or substituted mono halide or polyhalide. It can also be brought about by reaction with aralkyl halides which are, in effect, examples of substituted alkyl halides. For each of these different classes of starting materials different reaction conditions have to be used to obtain the highest yields but all will readily undergo the reaction under the usual conditions stated. In general, the order of reactivity for the halides decreases through the series alkyl iodide, alkyl bromide, alkyl chloride. Thus, it is necessary in the case of alkyl chlorides to use much more drastic conditions in order to bring about reaction than would be the case with the corresponding alkyl iodide. However, because of the relatively high costs of alkyl iodides, the use of these products is largely to be discounted and it is found that in many cases the most economic method of working is to use the alkyl bromide. In the examples given below alkyl bromides have been used as the starting materials but this should not be taken as imposing any limitations on the invention. In a similar manner, by using the three available stannous halides the order of reactivity decreases through the series, stannous iodide, stannous bromide, stannous chloride. Stannous iodide can be used instead of the stannous bromide or chloride mentioned in the examples.

An important feature of the invention is the type of catalyst which is used to promote reaction. I have found that a wide range of products, and combinations thereof, will act effectively as catalysts but the systems are highly selective and the best yields for any one system are often obtained with one particular catalyst. Suitable catalysts may be summarized into the following broad classification:

CLASS ONE

Strong organic Lewis bases such as alkylamines, arylamines, alkyl arylamines, amino alkanes, amino alkyl ethers, tri-aryl, triaralkyl, alkyl-aryl and trialkyl phosphites and phosphines, di-alkyl formamides and sulphones.

CLASS TWO

Moderately strong organic Lewis bases containing two or more of the following basic groups preferably of different character, hydroxyl, thioether, ether, mercaptan, carbonyl, nitrile, ester, amide.

CLASS THREE

Simple alcohols, ethers, thioethers, mercaptans, ketones, nitriles, esters, and amides in the presence of metals or metallic salts particularly of lithium, sodium, beryllium, boron, aluminum, magnesium, zinc, copper and cadmium.

The addition of metals or salts of metals indicated in Class III to catalysts in Class I and Class II is often advantageous.

The invention is illustrated by the following examples:

Example 1

Equimolar quantities of octyl bromide and stannous bromide were heated together at 160° C. in the presence of 10% by weight of triphenyl phosphite for 24 hours. The reaction mixture was then stripped under reduced pressure to afford a small quantity of unreacted octyl bromide followed by octyltin tribromide in excellent yield.

Example 2

Equimolar quantities of octyl bromide and stannous chlorine were heated together in the presence of triphenyl phosphite as in Example 1. In this instance the reaction took place much more slowly and separation of the products was more difficult to achieve.

Example 3

Equimolar quantities of butyl bromide and stannous bromide were heated at 160° in an autoclave in the presence of triphenyl phosphite. At the end of the reaction period the mixture was separated by distillation to give excellent butyl tin tribromide in good yield.

Example 4

Substitution of trioctyl phosphite, triphenyl phosphine or dimethyl formamide for the triphenyl phosphite in Example 3 gave essentially similar results.

Example 5

Equimolar quantities of butyl bromide and stannous bromide were heated at 160° in the presence of lithium, 0.1 mole and Cellosolve, 0.3 mole. After 48 hours the reaction was stopped and butyltin tribromide obtained by fractional distillation.

Example 6

Substitution of the Cellosolve in Example 5 by ethoxy propionitrile, ethoxy ethyl acetate, acetyl ether, and polyethylene glycol gave essentially similar results.

Example 7

Substitution of the lithium in Example 5 by magnesium, aluminium, and sodium gave slower reaction periods but still led to the formation of butyl tin tribromide.

What is claimed is:

1. A method of preparing alkyltin trihalides, comprising heating together an alkyl halide and stannous halide in the presence of a catalyst, wherein said catalyst is a compound selected from the group consisting of triaryl, triralkyl, alkyl-aryl and trialkyl phosphites and phosphines, dialkyl formamides, and sulphones.

2. A method of preparing alkyltin trihalides, comprising heating together an alkyl halide and stannous halide in the presence of a catalyst, wherein said catalyst is a mixture of a compound selected from the group consisting of triaryl, triaralkyl, alkyl-aryl and trialkyl phosphites and phosphines, dialkyl formamides, and sulphones with a member of the group consisting of metals and metal salts.

3. A method as claimed in claim 2 wherein said metal and the metal of said metal salt is selected from the group consisting of lithium, sodium, beryllium, boron, aluminum, magnesium, zinc, copper or cadmium.

References Cited

UNITED STATES PATENTS 3,340,283   9/1967   Gloskey _____ 260—429.7

TOBIAS E. LEVOW, *Primary Examiner.*

W. F. W. BELLAMY, *Assistant Examiner.*